(12) United States Patent
Phelan et al.

(10) Patent No.: US 7,288,578 B2
(45) Date of Patent: Oct. 30, 2007

(54) BIOCOMPATIBLE INKS, PREPARATION, AND USES THEREOF

(75) Inventors: John Christopher Phelan, Gurnee, IL (US); Michael Hugh Quinn, Valparaiso, IN (US)

(73) Assignee: Novartis AG, Basel (CH)

( * ) Notice: Subject to any disclaimer, the term of this patent is extended or adjusted under 35 U.S.C. 154(b) by 508 days.

(21) Appl. No.: 10/676,764

(22) Filed: Oct. 1, 2003

(65) Prior Publication Data

US 2004/0125338 A1   Jul. 1, 2004

Related U.S. Application Data

(60) Provisional application No. 60/423,230, filed on Nov. 1, 2002.

(51) Int. Cl.
G02C 7/04 (2006.01)

(52) U.S. Cl. .......................................... 523/160; 522/84

(58) Field of Classification Search .................. None
See application file for complete search history.

(56) References Cited

U.S. PATENT DOCUMENTS

| 4,778,880 A | 10/1988 | Symes et al. ................. 536/43 |
| 4,857,072 A | 8/1989 | Narducy et al. ................ 8/507 |
| 6,149,842 A | 11/2000 | Lally et al. ................. 264/1.36 |
| 6,162,844 A | 12/2000 | Lally et al. ................. 523/106 |

FOREIGN PATENT DOCUMENTS

WO    WO 00/71613    11/2000

*Primary Examiner*—Edmund H. Lee
(74) *Attorney, Agent, or Firm*—Jian Zhou

(57) ABSTRACT

An aqueous ink comprising containing a colorant and a radiation-curable oligomer or polymer containing H-active groups bonded to the oligomer or polymer backbone, some or all of whose hydrogen atoms have been substituted by radicals of a N-hydroxyalkyl (meth)acrylamide. Methods for printing the inventive inks upon medical devices, such as contact lenses, are also disclosed.

13 Claims, No Drawings

BIOCOMPATIBLE INKS, PREPARATION, AND USES THEREOF

This application claims the benefit under 35 U.S.C. §119 (e) of U.S. provisional application No. 60/423,230 filed Nov. 1, 2002, and is incorporated by reference in it's entirety.

The present invention relates to ink for creating images upon biomedical devices, particularly, contact lenses. Furthermore, the present invention is related to a method for making a colored contact lens.

BACKGROUND OF THE INVENTION

Methods have been disclosed to make printing inks suitable for printing either contact lenses or the molds that are then used to make contact lenses. For example, U.S. Pat. No. 4,668,240 to Loshaek discloses colored contact lenses produced by providing a contact lens constructed of polymer and coating at least a portion of the lens with coloring substance, a binding polymer having functional groups, and an additional compound having at least one of —NCO or epoxy.

U.S. Pat. No. 4,857,072 to Narducy, et al. discloses a method for making colored hydrophilic contact lenses. At least a portion of the surface of the lens is coated with a color coat comprising at least one pigment, binding polymer having functional groups, and an additional compound having at least two groups per molecule of —NCO.

U.S. Pat. No. 5,272,010 to Quinn discloses a method for preparation of colored contact lenses similar to that of those above except that an isocyanate compound is not required. Instead, adhesion promoters such as hexamethoxymethylmelamine are used.

However, all the above methods involve complex chemistry and result in a lens that requires extraction following the printing operation to remove unwanted residual compounds from the ink. If not extracted, such compounds would, at a minimum, cause irritation and discomfort when in contact with bodily tissue. The extraction process can be expensive and time-consuming and carries all the disadvantages of an additional step in any manufacturing process.

U.S. Pat. No. 6,162,844 to Lally, et al. teaches introducing at least one polymeric dye and polyvinyl alcohol into a mold, and crosslinking or polymerizing to form a lens. Likewise, U.S. Pat. No. 6,149,842 to Lally, et al. teaches the making of a tinted lens by mixing a metal phthalocyanine dye or pigment with polyvinyl alcohol, which is then dispensed into a lens mold and crosslinked or polymerized to entrap the dye or pigment within the polymeric network of the lens. However, while neither method requires extraction after printing, both result in a lens with dye or pigment dispersed throughout the lens, not an image printed on the surface or within the lens.

BRIEF SUMMARY OF THE INVENTION

The present invention provides for biocompatible ink useful for printing upon biomedical moldings. Such inks comprise water, at least one colorant, and a (meth)acrylamidoalkyl derivative of a polymer containing a plurality of H-active groups.

A second embodiment of the present invention provides a method for making a colored polymer substrate, preferably a medical device, most preferably a hydrophilic contact lens, comprising the steps of:

(a) providing a contact lens constructed of a polymer;

(b) coating at least a portion of a surface of the lens with a color coat comprising water, at least one colorant, and a (meth)acrylamidoalkyl derivative of a polymer containing a plurality of H-active groups; and (c) exposing the color coat to actinic radiation sufficient to crosslink said (meth)acrylamidoalkyl derivative.

A further aspect of the invention, a method for making a colored contact lens is provided. The method comprises the steps:

(a) coating at least a portion of at least one lens-forming surface of a lens mold with an ink comprising water, at least one colorant, and a (meth)acrylamidoalkyl derivative of a polymer containing a plurality of H-active groups; and (b) adding a lens forming composition to the lens mold while maintaining the ink in position; and (c) curing the lens-forming composition to form a colored lens.

Yet another embodiment of the present invention provides a biocompatible ink for printing a contact lens comprising water, at least one colorant, a crosslinkable, water-soluble poly(vinyl alcohol), and a (meth)acrylamidoalkyl derivative of a polymer containing a plurality of H-active groups The present invention provides the foregoing and other features, and the advantages of the invention will become further apparent from the following detailed description of the presently preferred embodiments, read in conjunction with the accompanying figures. The detailed description is merely illustrative of the invention and does not limit the scope of the invention, which is defined by the appended claims and equivalents thereof.

DETAILED DESCRIPTION OF THE INVENTION

In this specification, "(meth)acryl-" means "acryl-" and/or "methacryl-". For example, (meth)acrylamidoalkyl means acrylamidoalkyl and/or methacrylamidoalkyl, and (meth) acrylamide means acrylamide and/or methacrylamide.

"Colorant" includes both dyes and opaque coloring agents, either alone or in combination.

"Dye" means a substance that is soluble in a solvent and is used to impart color. Dyes are typically translucent and absorb, but do not scatter light. Dyes can cover both optical (covering the pupil) and non-optical regions (not covering the pupil) of contact lens. Nearly any dye can be used in the present invention, as long as it is compatible with the processes described herein, including fluorescent dyes, phosphorescent dyes, pearlescent dyes, and conventional dyes.

"Opaque coloring agent" includes both pigments and particles.

"Pigment" in the context of opaque coloring agents refers to a variety of organic or inorganic insoluble pigments known in the art, such as titanium dioxide, red iron oxide, yellow iron oxide, Pigment Blue 15 (phthalocyanine blue (CI 74160)), Pigment Green 7 (phthalocyanine green (CI 74260)), Pigment Blue 36 (cobalt blue (CI 77343)), or chromium sesquioxide. Some pigments may exhibit fluorescence or phosphorescence. The skilled artisan will recognize that any of a variety of pigments may be used.

"Particle" in the context of opaque coloring agents refers to a variety of colored particles, as they are known in the art, such as India ink. This term also includes structures that while not colored, give the appearance of color by, for example, diffraction or scattering (for example) of light by the particle. Some particles may exhibit fluorescence or phosphorescence.

"Ophthalmically compatible," as used herein, refers to a material or surface of a material which may be in intimate contact with the ocular environment for an extended period of time without significantly damaging the ocular environment and without significant user discomfort. Thus, an ophthalmically compatible contact lens will not produce significant corneal swelling, will adequately move on the eye with blinking to promote adequate tear exchange, will not have substantial amounts of lipid adsorption, and will not cause substantial wearer discomfort during the prescribed period of wear. The lenses of the present invention are preferably ophthalmically compatible.

"Ocular environment," as used herein, refers to ocular fluids (e.g., tear fluid) and ocular tissue (e.g., the cornea) which may come into intimate contact with a contact lens used for vision correction, drug delivery, wound healing, eye color modification, or other ophthalmic applications.

"Pattern" refers to a predetermined image to be printed onto the contact lenses. The pattern may either be fanciful or realistic in appearance. The pattern is preferably designed in accordance with U.S. Pat. No. 5,160,463 to Evans et al. and U.S. Pat. No. 5,414,477 to Jahnke).

A "medical device" refers to a device having surfaces that contact tissue, blood, or other bodily fluids of patients in the course of their operation. Exemplary medical devices include, among others: (1) prostheses implanted in a human or animal body; (2) devices for temporary use within the body for purposes of e.g., monitoring or repair; and (3) ophthalmic lenses.

An "ophthalmic lens," as used herein, refers to a contact lens (hard or soft), or an intraocular lens. In certain aspects of the present invention, a lens need not act as an optical lens, such as a contact lens that is used for vanity purposes as opposed to purposes relating to the correction, improvement, or alteration of a user's eyesight.

The biocompatible prepolymers within the inks of this invention are radiation-curable oligomers and polymers containing H-active groups bonded to the oligomer or polymer backbone, some or all of whose H atoms have been substituted by radicals of a N-hydroxyalkyl (meth)acrylamide. The H-active groups are —OH, and/or —NH— groups, with —OH being preferred. The H-active groups may be attached to the polymer in a variety of ways. For example, the H-active groups can be attached directly (as in PVA) or indirectly (as in poly(acrylamide)) to the polymer backbone. Acrylamide or dimethylacrylamide (DMA) can be copolymerized with the N-hydroxyalkyl (meth)acrylamide and the pendant H-active group from the N-hydroxyalkyl (meth)acrylamide will be present in the resultant copolymers. The resultant copolymers can then be functionalized with a N-hydroxyalkyl (meth)acrylamide. In addition the N-hydroxyalkyl (meth)acrylamide can be directly attached to poly(acrylamide) copolymers through condensation reactions of poly(acrylamide) amide groups with NHMA. Likewise, among polysaccharides, the —OH group can be attached directly to the sugar ring (as in dextran), or, as in hydroxypropylcellulose, the hydroxyl group of interest can be indirectly attached to the polymer backbone.

The water-soluble polymers that may be modified in accordance with this invention include polysaccharides or polysaccharide derivatives and synthetic polymers. The term "polysaccharide or polysaccharide derivative" is used conventionally herein and refers generally to polysaccharides (i.e., polymers comprised of monosaccharide units linked together by glycosidic bonds) or chemical modifications of polysaccharides which polysaccharides or chemical modifications thereof are soluble in one or more aqueous liquids. By the term "water soluble," it is meant that the polymer is capable of being admixed with water under appropriate temperature and pH conditions such that the resulting mixture appears as a homogeneous liquid under visual inspection with no magnification. Thus, water-soluble polymers may form true solutions in water, colloidal dispersions in water, or emulsions in water. Alternatively, the prepolymer can be a material that is a liquid under ambient physiological conditions. Preferably, the polymer can form a true solution in water.

Particularly suitable polymers are polysaccharides that contain one or more of the following monosaccharide units: arabinose, fructose, galactose, galactopyranosyl, galacturonic acid, guluronic acid, glucuronic acid, glucose, glucoside, N-acetylglucosamine, mannuronic acid, mannose, pyranosyl sulfate, rhamnose, or xylose. Polysaccharides containing the foregoing units include cyclodextrins, starch, hyaluronic acid, deacetylated hyaluronic acid, chitosan, trehalose, cellobiose, maltotriose, maltohexaose, chitohexaose, agarose, chitin 50, amylose, glucans, heparin, xylan, pectin, galactan, glycosaminoglycans, dextran, aminated dextran, cellulose, hydroxyalkylcelluloses, carboxyalkylcelluloses, fucoidan, chondroitin sulfate, sulfate polysaccharides, mucopolysaccharides, gelatin, zein, collagen, alginic acid, agar, carrageean, guar gum, gum arabic, gum ghatti, gum karaya, gum konjak, gum tamarind, gum tara, gum tragacanth, locust bean gum, pectins, and xanthan gum. Polysaccharides that are either anionic or cationic include the natural polysaccharides alginic acid, carrageenan, chitosan (partially deacetylated chitin), gum arabic, gum ghatti, gum karaya, gum tragacanth, pectins, and xanthan gum.

The preferred polysaccharides are dextran, hydroxypropylcellulose, hydroxyethylcellulose, and those comprising glucose monosaccharide units. Dextran is the most preferred polysaccharide.

The solubility of the aforementioned polysaccharides and derivatives thereof is dependent upon a variety of factors including crystalinity, the average degree of polymerization and, in the case of polysaccharide derivatives, the particular substituent and the degree of substitution, i.e., the number of substituent groups per anhydroglucose unit of the polysaccharide molecule. In general, the relative solubility of the polysaccharide in an aqueous liquid increases as the molecular weight decreases. Additionally, a polysaccharide derivative having a low degree of substitution may only be soluble in alkaline aqueous liquid, whereas a polysaccharide derivative having a higher degree of substitution may be soluble in water as well as an alkaline aqueous liquid. The particular substituent and the degree of substitution which imparts the desired solubility to the polysaccharide derivatives are well known in the art and reference is made thereto for the purposes of this invention.

Synthetic polymers containing a plurality of pendent hydroxyl groups are also suitable for use in the present invention. Suitable synthetic hydroxy containing polymers include poly(vinyl alcohol), poly(ethylene glycol), poly(propylene oxide), and PEG-block-PPO, PEG-block-PPO-block-PEG and PPO-block-PEG-block-PPO. Polymers having a plurality of pendent hydroxyl groups can be formed by the polymerization of vinyl esters. The pendent ester groups, when hydrolyzed, form polymers containing pendent hydroxyl groups. A preferred class of polymers having a plurality of pendent hydroxyl groups are based upon hydrolyzed vinyl acetate polymers wherein vinyl acetate is polymerized as a homopolymer or in conjunction with other monomers to form copolymers and are known as poly(vinyl alcohol) or vinyl alcohol copolymers. Polymerization or copolymerizaiton of 2-hydroxyethylmethacrylate (HEMA), glceyerolmethacrylate will yield hydroxy containing polymers or copolymers.

Polyvinyl alcohols that can be derivatized in accordance with the invention preferably have a molecular weight of at least 10,000. As an upper limit the polyvinyl alcohols may have a molecular weight of up to 1,000,000. Preferably, the polyvinyl alcohols have a molecular weight of up to 300,000, especially up to approximately 100,000 and especially preferably up to approximately 50,000.

Amide containing polymers, such as poly(acrylamide) and poly(acrylamide), copolymers can also be converted to radiation curable prepolymers by the present invention.

The preferred polymer is dextran, which is commercially available in a wide variety of molecular weights. Preferably, the dextran has a molecular weight of at least 5,000 Daltons. As an upper limit the dextran may have a molecular weight of up to 1,000,000. Preferably, the dextran has a molecular weight of 5,000 to 500,000, especially from 10,000 to 100,000, and especially preferably up to approximately 50,000.

The functionalizing compound contains a hydroxyl group, an amine group, and a radical-polymerizable acrylic group. Specifically preferred are N-hydroxyalkyl (meth)acrylamides of the general structure:

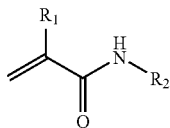

wherein $R_1$ is methyl or —H; $R_2$ is —$[(CH_2)_x$—O—$]_y$—H, where x is 1,2, or 3 and y is 1-5. The preferred $R_1$ is —H. Within $R_2$, x is preferably 1, and y is preferably 1 or 2; most preferably, both x any y are 1.

The preferred N-hydroxyalkyl (meth)acrylamides include, for example, N-2-hydroxylethyl acrylamide, N-2-hydroxyethyl methacrylamide, N-methylol acrylamide, and N-methylol methacrylamide. N-methylol acrylamide is the most preferred functionalizing compound.

Starting with a water-soluble polymer as described above, such materials are modified by reaction with a N-hydroxyalkyl (meth)acrylamide to impart a functionality capable of covalent crosslinking by free radical polymerization. Such free radical polymerization may be initiated by light or other forms of energy using appropriate initiators. Polysaccharides are generally insoluble in organic solvents, thus limiting the ability to modify these materials. One aspect of the present invention involves the modification of these materials by reaction with a N-hydroxyalkyl (meth)acrylamide in a substantially aqueous solution.

To prepare the modified polymer, the concentration of the water-soluble polymer is generally as high as possible to maximize productivity. It is usually above 20% and preferably above 40%. For example, for cellulosic derivatives the concentration is at least 10% by weight and usually at least 20% by weight. For dextrans the concentration is generally at least 20% by weight and preferably between 40 and 60% by weight. The maximum concentration is generally below 80%, usually below 60%, and is dependent upon the viscosity of the resultant dispersion or solution.

Application of heat and/or the addition of a condensation catalyst such as ammonium chloride, or organic acids, such as acetic acid, benzoic acid, or tartaric acid catalyze the functionalization of the starting polymer. Accordingly, the reaction solution preferably comprises a water-soluble condensation catalyst. For the reaction of the starting polymer with a N-hydroxyalkyl (meth)acrylamide, the catalyst is preferably an acid (often an acid generating) catalyst, such as ammonium chloride. The concentration of an acid catalyst in the aqueous phase is generally sufficient to generate a pH of less than 6 and preferably less than 5. For example, the concentration of ammonium chloride is generally at least 0.1% by weight, generally at least 0.5% by weight, and preferably at least 2% by weight.

One of skill in the art will recognize that the degree of substitution or loading of the photo-curable groups onto polymer substrates can be controlled through the concentration and the amount of the N-hydroxyalkyl acrylamide in a reaction solution. The degree of substitution can also be controlled through the reaction temperature, reaction time, and amount of catalyst (e.g. ammonium chloride) used.

Because the N-hydroxyalkyl acrylamide contains an unsaturated group, a polymerization inhibitor should be included in the aqueous solution to prevent premature polymerization of the solution. Because the reaction is carried out in an aqueous solution a water-soluble polymerization inhibitor can be dissolved or dispersed throughout the solution to prevent polymerization and cross-linking reactions during the condensation reaction. These reactions are undesirable since the product is heterogeneous, difficult to isolate, insoluble, and possibly commercially unsatisfactory for the purposes contemplated herein.

The polymerization inhibitor preferably comprises monomethylether hydroquinone (MEHQ) in an amount of at least 1 ppm, preferably more than 50 ppm, often at least 500 ppm, and sometimes greater than 2,000 ppm. Other conventional inhibitors which are compatible with the functionalization reaction may be used in effective amounts. For example, other effective polymerization inhibitors are hydroquinone, paramethoxyphenol, phenylthiazine, copper salts, and methylene blue. If copper (II) is used, it is used in an amount of at least 1 ppm, preferably 5 or 10 ppm, often at least 100 ppm, and sometimes 2,000 ppm or more. The inhibitor may be removed, if necessary, in a subsequent step but may often be left in the product. Copper (II) ions or other metal ions may be removed by contacting an aqueous solution of the product with an ion exchange resin. Alternatively, one could bubble oxygen or air or other mixtures containing oxygen into the reaction mixture to prevent premature polymerization. Oxygen is easily removed from the reaction mixture by known methods.

By way of the above-described process a water-soluble photo-crosslinkable N-hydroxyalkyl (meth)acrylamide functionalized polymer can be obtained. Due to their inherent biocompatibility, physical properties, and optical clarity, the preferred polymers are dextran and polyvinyl alcohol. Dextran is preferably reacted with a N-hydroxyalkyl (meth) acrylamide in the presence of heat and/or ammonium chloride to yield a compound of the following general structure:

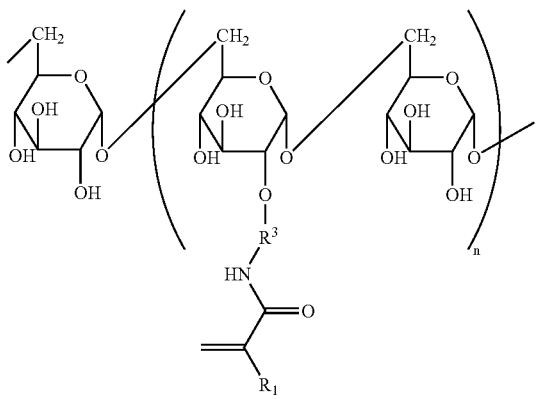

wherein $R_1$ is methyl or —H; and $R_3$ is —$(CH_2)_a$— or —$[(CH_2)_a$—O—$]_b$—, where a is 1,2, or 3 and b is 1-5. The preferred $R_1$ is —H. $R_3$ is preferably —$(CH_2)_a$—, with a being 1. If $R_3$ is —$[(CH_2)_a$—O—$]_b$—, both b and a are preferably 1.

The preferred prepolymer of the present invention is an acrylamidomethyl derivative of dextran. As discussed and exemplified in more detail below, by way of example, the conversion of dextran to a photo-curable prepolymer through reaction with N-hydroxymethyl acrylamide results in a compound of the general structure:

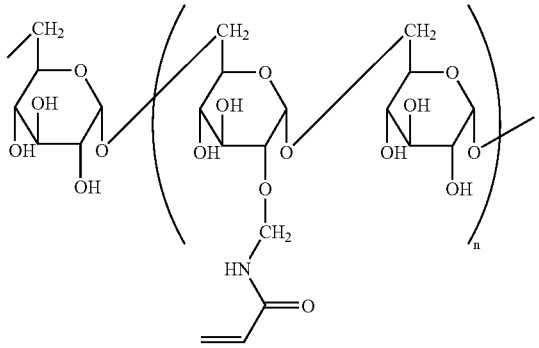

The functionalized polymers of the present invention can be used as an ink binder. In this aspect of the invention, an ink comprises water, a functionalized polymer, and a colorant. Such inks are useful in printing biomedical moldings, preferably contact lens. For cosmetic purposes, contact lenses having one or more colorants dispersed in the lens or printed on the lens are in high demand. These colored contact lenses enhance the natural beauty of the eye, or provide unique patterns on the iris of the wearer, or provide non cosmetic patterns or marks, such as rotation marks, inversion marks, product/brand codes, lot numbers, "DEMO" lenses, and the like, which are of benefits to wearers, eye-care practitioners and manufacturers.

Presently, methods of printing inks onto contact lens molds involve cliché ink transfer printing. A typical example of this printing follows. An image is etched into metal to form a cliché. The cliché is placed in a printer. Once in the printer, the cliché is inked by either an open inkwell doctoring system or by a closed ink cup sliding across the image. Then, a silicone pad picks up the inked image from the cliché and transfers the image to the contact lens. The silicone pads are made of a material comprising silicone that can vary in elasticity. The properties of the silicone material permit the inks to stick to the pad temporarily and fully release from the pad when it contacts the contact lens mold. A number of inks are known in the art for cliché ink transfer printing of color images on a contact lens. Examples of such inks include those disclosed in U.S. Pat. Nos. 4,668,240; 4,857,072; 5,272,010; and 5,414,477; and copending and commonly assigned Application Ser. No. 60/408,056, filed Sep. 3, 2002, all incorporated herein by reference.

Recently, however, methods of printing contact lenses have been developed that employ ink-jetting as a method of placing a color pattern upon the surface of the lens. Such methods require inks of much lower viscosity than currently available inks. For example, while the viscosity of inks used in pad-printing techniques is typically between 200 and 500 cps, the viscosity required for ink-jet printing is below 50, and preferably lower than 30 cps.

Solutions having low viscosity tend to be "runny" when dispensed, and can allow different colors to merge and blend, resulting in an image with a more natural appearance. Such blending can be enhanced using a variety of methods, including sonication or vibration at appropriate duration and frequency to promote appropriate blending. Solutions having too low a viscosity can result in images that are too "runny" and thus have potentially, undesirable characteristics, such as pooling of ink in a pattern or spreading of ink to an unintended location. The skilled artisan will recognize that the size of the ink droplet as applied to the lens and the surface tension thereof will also influence the behavior of the ink when printed on a lens or a mold. Thus, depending on these factors, the viscosity of the ink may vary from the numbers given above and still function within the scope of this invention.

Solutions having too high a viscosity may not be easily dispensed using a variety of printing structures, such as inkjets and thus may not be appropriate for the present invention. Furthermore, solutions having high viscosity can tend to "bead" on a surface and not blend with the surrounding environment, including surrounding droplets or beads of ink. Under these circumstances, the ink may form unnatural appearing images.

Copending U.S. Application Ser. No. 60/348,257, filed Nov. 7, 2001, incorporated herein by reference and commonly assigned with the present application, discloses a colored ink to be printed upon a medical device by ink-jetting methods. Consistent with the teachings of that application, every ink disclosed therein has a viscosity significantly lower than 50 centipoise. Because nelfilcon A is a rather viscous solution, water must be added to the ink to obtain the desired viscosity. However, at higher levels of colorant, the reduced concentration of nelfilcon may be inadequate to bind the ink to the contact lens.

While the viscosity lowering effects of the addition of an acrylamidomethyl derivative of dextran to nelfilcon is especially suited for inks employed in inkjet printing, such binders can also be useful in pad-printing applications. At high levels of colorant ($\approx$8% PCN), up to 47% nelfilcon was unable to hold the ink together and properly bind to the contact lens. It is suspected that the polymer density of such inks was too low to hold the high PCN levels. However, the addition of nelfilcon up to 71% by weight resulted in ink much more viscous than is preferred, even for pad printing. Accordingly, the addition of an acrylamidomethyl derivative of dextran to the nelfilcon ink having high colorant levels is expected to result in an ink with low enough viscosity to be pad printed, but yet still have sufficient stability when printed on a contact lens.

It has been found that the addition of an acrylamidomethyl derivative of the present invention to a functionalized poly (vinyl alcohol) in both major and minor amounts may expand the range at which concentrations of the various components may be employed. One particularly preferred functionalized poly(vinyl alcohol) is an acrylate-modified PVA known generically as nelfilcon A. Nelfilcon A can be prepared substantially as described in U.S. Pat. No. 5,508,317 to Müller, incorporated herein by reference.

Accordingly, the functionalized polymers of the present invention can be used in conjunction with nelfilcon as an ink binder. In this aspect of the invention, an ink comprises water, a functionalized polymer, nelfilcon, and a colorant. The substitution in part of the functionalized polymer according the present invention for nelfilcon will result in lower viscosity than the nelfilcon alone. The preferred functionalized polymer is an acrylamidomethyl derivative of dextran.

The proper concentration of an acrylamidomethyl derivative of the present invention, nelfilcon, the colorant, and water to achieve the preferred ink viscosity can be determined, for example, by a design of experiment by modeling the design as a quadratic D-optimal mixture design. This can be done, for example, with a commercial software program, such as Design Expert (v. 6.0.0, from Stat-Ease of Minneapolis, Minn.).

When employing a functionalized polymer of the present invention as an ink binder, either alone or in conjunction with another binder, for printing contact lenses, it is not important that the functionalized polymer be optically transparent unless the ink is to be printed over the pupil area of the contact lens.

Lenses colored by this invention can be formed from any known polymerizable hydrophilic or hydrophobic material suitable for ophthalmic uses. Lens forming materials that are suitable in the fabrication of contact lenses are illustrated by numerous issued U.S. patents and familiar to those skilled in the art. Preferred materials are hydrophilic and absorb substantial amounts of water to form hydrogels. While the selection of a lens material is largely determined upon the final modality of use of the final contact lens, the presently preferred lens material is nelfilcon. Nelfilcon contact lenses are available commercially from CIBA Vision of Duluth, Ga.

Producing the lens by polymerization, crosslinking, and/or shaping is well known in the art and is not presently considered a critical part of this invention. Any of the well-known techniques of cast molding and spin casting may be employed.

If the ink is printed onto a formed polymeric lens, the lens is subjected to conditions that cause the ink to adhere to the lens, thereby entrapping the colorant within the ink in a manner that forms a colored contact lens. The coated lens, for example, may be exposed to actinic radiation, such as, for example, UV light, or by ionizing radiation, such as, for example, gamma radiation, electron radiation or X radiation. Crosslinking can usually be carried out in a very short time, for example in less than five minutes, preferably in less than one minute. One of ordinary skill in the art can easily ascertain the type, time, and energy of the radiation required to crosslink the polymer within the ink.

When the color coat is applied to the lens mold, rather than to the lens itself, the color coat is applied to a surface of the mold and the mold is then charged with the lens forming monomer while maintaining the color coat in the iris portion and configuring the resin about the color coat. The lens monomer is then polymerized using any of the well-known polymerization techniques. Alternatively, if the lens forming composition is a polymer (such as poly(vinyl) alcohol) the composition is then cross-linked according to well-known techniques. In this manner the color coat becomes integral with the body of the lens when the molded lens is removed from the mold. The resulting lens is essentially smooth and continuous on the surface containing the color coat.

If the lens is intended to be natural in appearance, the pattern applied to the lens preferably contains voids. Typically the voids comprise about 5 to about 80% of the pattern's area. On the other hand, it is preferred that the pattern occupy from 50% to all of the area of the lens in the iris region thereof (or that portion of the mold corresponding to the iris region of the lens). If the colorant is opaque, then only the portion of the lens corresponding to the iris is usually printed, leaving the pupil section clear. For lenses that are larger in diameter than the iris, the portion of the lens extending beyond the iris may be left unprinted.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims. Furthermore, any headings of various portions of the description of the preferred embodiment are for convenience only and are not meant to limit the scope of the invention in any way.

The invention claimed is:

1. An ink comprising
    a. water;
    b. at least one colorant including pigment particles;
    c. ink binders including an acrylate-modified poly(vinyl alcohol) and a radiation-curable (meth)acrylamidoalkyl derivative of an oligomer or polymer containing a plurality of H-active groups;
    wherein the radiation-curable (meth)acrylamidoalkyl derivative is added in the ink in an amount sufficient to provide the ink a desired viscosity for ink-jet printing or pad-printing while still being able to hold together and properly bind the ink to an ophthalmic lens onto which the ink is applied.

2. An ink as claimed in claim 1, wherein said H-active groups are selected from the group consisting of $-NH_2$ groups and $-OH$ groups.

3. An ink as claimed in claim 1, wherein said (meth)acrylamidoalkyl derivative is obtained by substituting at least one hydrogen atom in H-active groups of the oligomer or polymer with radicals of a N-hydroxyalkyl (meth)acrylamide of the structure

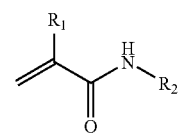

wherein $R_1$ is methyl or —H; $R_2$ is —[$(CH_2)_x$—O—]$_y$—H, where x is 1, 2, or 3 and y is 1-5.

4. An ink as claimed in claim 3, wherein the N-hydroxyalkyl (meth)acrylamide is selected from the group consisting of N-2-hydroxylethyl acrylamide, N-2-hydroxyethyl methacrylamide, N-methylol acrylamide, and N-methylol methacrylamide.

5. An ink as claimed in claim 2, wherein said polymer is selected from the group consisting of polysaccharides, polysaccharide derivatives, poly(ethylene glycol), poly(propylene oxide), PEG-block-PPO, poly(acrylamide), and copolymers thereof.

6. An ink as claimed in claim 5, wherein said polymer is selected from the group consisting of dextran, hydroxypropylcellulose, hydroxyethylcellulose, and polysaccharides comprising glucose monosaccharide units.

7. An ink as claimed in claim 1, wherein said polymer is dextran and said N-hydroxyalkyl (meth)acrylamide is N-methylol acrylamide.

8. An ink as claimed in claim 2, wherein said (meth) acrylamidoalkyl derivative is obtained by substituting at least one hydrogen atom in H-active groups of the oligomer or polymer with radicals of a N-hydroxyalkyl (meth)acrylamide of the structure

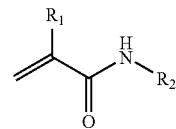

wherein $R_1$ is methyl or —H; $R_2$ is —[$(CH_2)_x$—O—]—H, where x is 1, 2, or 3 and y is 1-5.

9. An ink as claimed in claim 8, wherein the N-hydroxyalkyl (meth)acrylamide is selected from the group consisting of N-2-hydroxylethyl acrylamide, N-2-hydroxyethyl methacrylamide, N-methylol acrylamide, and N-methylol methacrylamide.

10. An ink as claimed in claim 3, wherein said polymer is selected from the group consisting of polysaccharides, polysaccharide derivatives, poly(ethylene glycol), poly(propylene oxide), PEG-block-PPO, poly(acrylamide), and copolymers thereof.

11. An ink as claimed in claim 10, wherein said polymer is selected from the group consisting of dextran, hydroxypropylcellulose, hydroxyethylcellulose, and polysaccharides comprising glucose monosaccharide units.

12. An ink as claimed in claim 2, wherein said polymer is dextran and said N-hydroxyalkyl (meth)acrylamide is N-methylol acrylamide.

13. An ink as claimed in claim 3, wherein said polymer is dextran and said N-hydroxyalkyl (meth)acrylamide is N-methylol acrylamide.

* * * * *